United States Patent
Schwartz et al.

(10) Patent No.: US 10,498,758 B1
(45) Date of Patent: *Dec. 3, 2019

(54) NETWORK SENSOR AND METHOD THEREOF FOR WIRELESS NETWORK VULNERABILITY DETECTION

(71) Applicant: Armis Security Ltd., Tel Aviv (IL)

(72) Inventors: Tomer Schwartz, Tel Aviv (IL); Nadir Izrael, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 112 days.

This patent is subject to a terminal disclaimer.

(21) Appl. No.: 15/635,472

(22) Filed: Jun. 28, 2017

(51) Int. Cl.
*H04L 29/06* (2006.01)
*H04L 12/26* (2006.01)

(52) U.S. Cl.
CPC .......... *H04L 63/1433* (2013.01); *H04L 43/12* (2013.01); *H04L 63/14* (2013.01); *H04L 63/1416* (2013.01); *H04L 63/1425* (2013.01); *H04L 63/1441* (2013.01); *H04L 63/20* (2013.01)

(58) Field of Classification Search
CPC ..... H04L 63/1416; H04L 63/20; H04L 29/06; H04L 63/0218; H04L 63/0236; H04L 63/0263; H04L 63/04; H04L 63/0823; H04L 63/083; H04L 63/10; H04L 63/1408; H04L 63/1441; H04L 63/102; G06F 21/577; G06F 21/554
See application file for complete search history.

(56) References Cited

U.S. PATENT DOCUMENTS

| | | | |
|---|---|---|---|
| 6,363,489 B1 | 3/2002 | Comay et al. | |
| 7,346,338 B1 | 3/2008 | Calhoun et al. | |
| 8,254,286 B2 | 8/2012 | Nechushtan et al. | |
| 8,639,800 B2 | 1/2014 | Friedrich et al. | |
| 9,027,079 B2 | 5/2015 | Comay et al. | |
| 2006/0026273 A1 | 2/2006 | Comay et al. | |
| 2006/0026682 A1 | 2/2006 | Zakas | |
| 2013/0074143 A1 | 3/2013 | Bu et al. | |
| 2017/0353498 A1* | 12/2017 | Huang | H04L 63/20 |
| 2017/0353499 A1* | 12/2017 | Huang | H04L 63/20 |
| 2018/0097775 A1* | 4/2018 | Obaidi | H04W 4/80 |

OTHER PUBLICATIONS

The European Search Report and Opinion for European Patent Application No. 18180066.5 dated Oct. 23, 2018, EPO, Munich, Germany.

* cited by examiner

*Primary Examiner* — Amir Mehrmanesh
(74) *Attorney, Agent, or Firm* — M&B IP Analyst, LLC

(57) ABSTRACT

Certain embodiments disclosed herein include a method for detecting potential vulnerabilities in a wireless environment. The method comprises collecting, by a network sensor deployed in the wireless environment, at least wireless traffic data; analyzing the collected wireless traffic data to detect at least activity initiated by a wireless entity in the wireless environment; sending, to a control system, data indicating the detected wireless entity; and enforcing a security policy on the detected wireless entity based on instructions received from the control system.

19 Claims, 5 Drawing Sheets

NETWORK SENSOR AND METHOD THEREOF FOR WIRELESS NETWORK VULNERABILITY DETECTION

TECHNICAL FIELD

The present disclosure generally relates to cybersecurity systems, and more particularly to detection of vulnerable wireless networks coexisting in a secured environment.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack.

The ever-increasing utilization of wireless devices and wireless networks poses a real threat to any organization, due to vulnerabilities of such devices. Practically any electronic device is now connected to the internet over a wireless connection, thereby rendering communications susceptible to interception or interference. Further, in a typical organization, many wireless networks coexist, where each such network may be secured or unsecured. An attacker can access a wireless device or a different network through almost any wireless network or wireless connection (e.g., a Bluetooth® connection).

Another factor that increases the vulnerability of an organization is the fact that employees or guests often want to use their own devices to access data, some or all of which may be sensitive data. This type of data access using personal devices is typically referred to bring your own device (BYOD). Of course, devices not set up specifically for the organization can put the organization's sensitive business systems and data at further risk.

As an example, a recent vulnerability in FitBit® fitness trackers infect nearby devices with malware over a Bluetooth® connection. Currently, cyber-attacks over Bluetooth® require an attacker to be in physical proximity (e.g., within a few meters) of a target device. The infecting malware can be delivered just seconds after connection of devices and, as a result, even fleeting proximity can be a problem. Thus, an employee with an infected FitBit® fitness tracker can unintentionally infect other devices in the organization with malware by connecting the infected FitBit® tracker to other devices. The employee's device could have been exploited by a hacker, for example, on a subway ride.

To secure their systems, infrastructure, and services, organizations utilize many different security products. A typical organization network is protected by products such as firewalls, anti-virus software, malware detection software, authentication and authorization systems, intrusion detection, anti-phishing systems, network and end point behavior analysis, data leak prevention systems, web application firewalls (WAFs), and so on.

Typically, such products are utilized to detect, mitigate, or both detect and mitigate, known vulnerabilities or threats. As an example, an enterprise network can implement one security product for an intrusion detection system (IDS) and another product for detecting malware downloaded by a remote resource that is sent to a secured resource in the organization over the Internet. The defense provided by an IDS is limited to the internal (and monitored) networks, but cannot be utilized to detect intrusion to and from unmonitored networks, e.g., wireless networks co-existing in the wireless environment of the internal network.

As another example, a conventional data leak prevention system can detect a sensitive document sent to an end-point over the Internet. However, such a system cannot detect a sniffer that traps any document sent to a wireless printer in the organization.

The aforementioned shortcomings arise due to the fact that existing security solutions are designed to scan wireless activity by any wireless network, wireless activity in the protected organization, or both. Such existing security solutions are typically not designed to monitor activity of devices that are legitimately connected to a protected organization's infrastructure or network.

Another challenge posed by the myriad of wireless devices that may connect to an organization's infrastructure or network is that software and firmware are frequently updated. For example, a typical smartphone is updated with a release of new software updates for an operating system (OS) and for each application installed thereon at least annually. Thus, trying to profile such devices may be an inefficient task.

It would therefore be advantageous to provide a cybersecurity solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting potential vulnerabilities in a wireless environment. The method comprises collecting, by a network sensor deployed in the wireless environment, at least wireless traffic data; analyzing the collected wireless traffic data to detect at least activity initiated by a wireless entity in the wireless environment; enforcing a security policy on the detected wireless entity, wherein the security policy is configured.

Certain embodiments disclosed herein also include a network sensor, comprises a processing circuitry; and a memory, the memory containing instructions that, when executed by the processing circuitry, configure the network sensor to: collect at least wireless traffic data; analyze the collected wireless traffic data to detect at least activity initiated by a wireless entity in the wireless environment; enforce a security policy on the detected wireless entity, wherein the security policy is stored in the memory.

BRIEF DESCRIPTION OF THE DRAWINGS

The subject matter disclosed herein is particularly pointed out and distinctly claimed in the claims at the conclusion of the specification. The foregoing and other objects, features.

DETAILED DESCRIPTION

Figure 1:
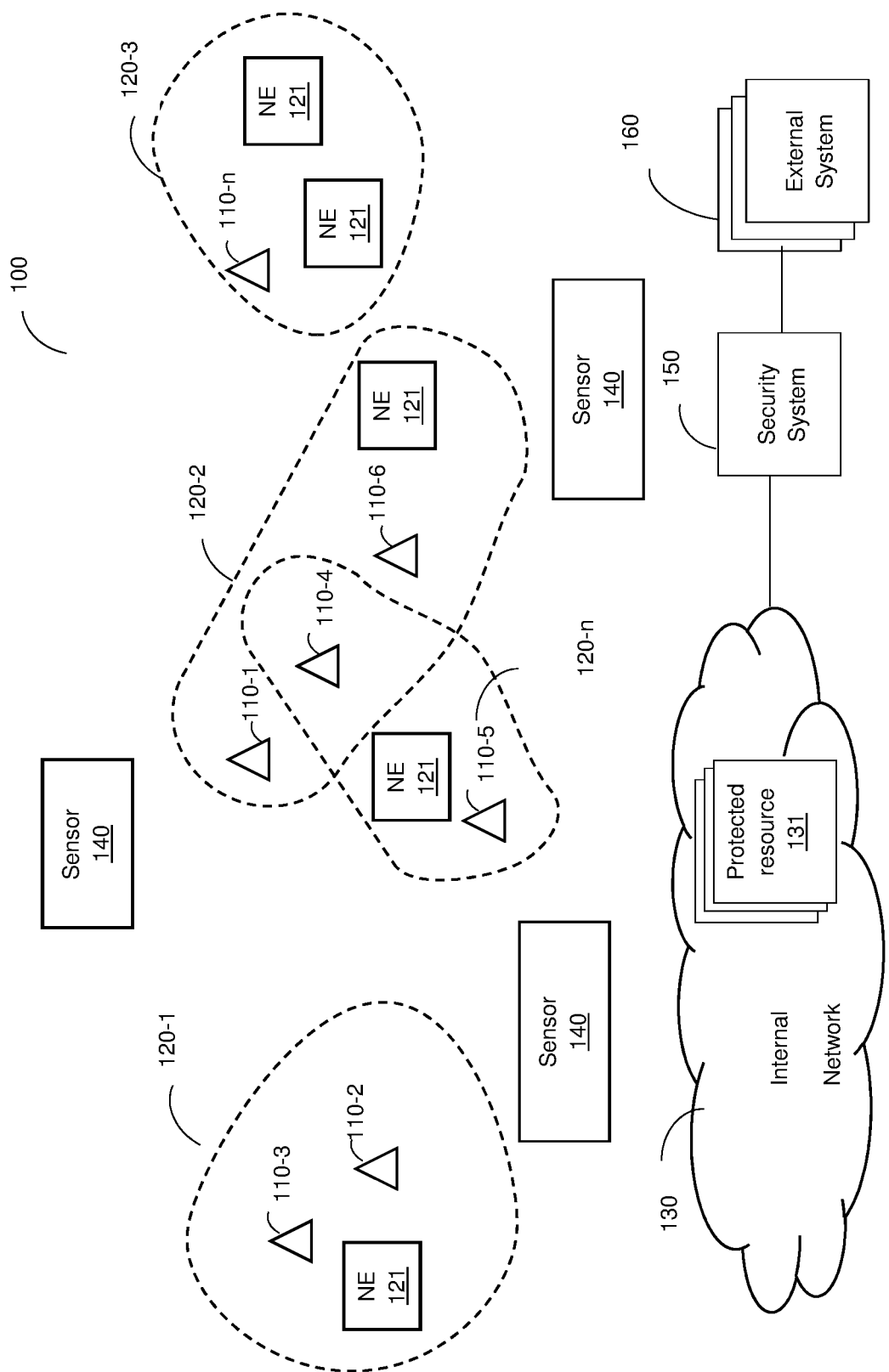
FIG. 1 is a diagram of a wireless environment utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In a wireless network of a typical organization, there are many sources of potential cyber vulnerabilities. Such sources may include, for example, vulnerable networks, rogue access points, malicious devices connected to the network, vulnerable devices connected to the network (e.g., devices lacking proper security features or lacking up-to-date versions of software), sending of sensitive data through the network, and so on. The embodiments disclosed herein provide techniques for utilizing network sensors to detect potential cyber vulnerabilities present in wireless environments. The potential cyber vulnerabilities may be wireless entities detected based on network traffic. The wireless entities may be, but are not limited to, devices within or connected to the wireless environment, connections established within the wireless environment, networks connected within the wireless environment, and the like, and may be existing entities or new entities (e.g., newly established connections, newly connected devices, newly connected networks, etc.). In some embodiments, the sensors may be further configured to control traffic or otherwise mitigate potential vulnerabilities in the network.

FIG. 1 is an example network diagram of a wireless environment 100 utilized to describe the various disclosed embodiments. The wireless environment 100 includes a plurality of wireless devices 110-1 through 110-*m* (hereinafter referred to individually as a wireless device 110 and collectively as wireless devices 110, merely for simplicity purposes) and a plurality of coexisting wireless networks 120-1 through 120-*n* (hereinafter referred to individually as a wireless network 120 and collectively as wireless networks 120, merely for simplicity purposes), thereby allowing for communication between and among the wireless devices 110. A wireless network 120 may further include one or more network elements (collectively labeled as "121"), such as a wireless access point (AP), a wireless router, a switch, and the like.

Also, operable in the wireless environment 100 is an internal network 130 of an organization. The internal network 130 includes protected resources 131. Such protected resources 131 may include, but are not limited to, servers, computers, databases, services, applications, data, and the like. The internal network 130 may be a wired network, a wireless network, or a combination thereof.

Each wireless device 110 may be, but is not limited to, a laptop, a PC, a smartphone, an Internet of Things (IoT) device, a wearable device, a peripheral device (e.g., a printer, a mouse, a keyboard, a speaker, etc.), an appliance, a remote controller, a wireless router (access point), or any electrical or electronic device that can communicate over a wireless network.

The wireless network 120 can facilitate communication using wireless communication protocols including, but not limited to, Wi-Fi, nRF, cellular communication protocols (e.g., LTE, 2G, 3G, 4G, etc.), Bluetooth®, Wi-Gi, Zigbee, Z-Wave, 5 BLE, EnOcean, DECT, and the like. It should be noted that application layer protocols can communicate over such wireless protocols. Examples for application layer protocols include, but are not limited to, AirDrop®, hypertext transfer protocol (HTTP), server message block (SMB), NT Lan Manager (NTLM), Object Exchange (OBEX), and the like.

According to the disclosed embodiments, a plurality of sensors (hereinafter referred to collectively as sensors 140) and a security system 150 are deployed in the wireless network 100. Each sensor 140 is deployed as an out-of-band device and is configured to monitor and control the wireless traffic transmitted by the wireless devices 110 in the proximity of where the sensor 140 is deployed.

Each sensor 140, regardless of its type, is configured to process the monitored traffic based on a corresponding wireless commination protocol. For example, if the monitored traffic is transmitted over a Bluetooth® connection, the sensor 140 is configured to extract data as carried by the Bluetooth® protocol through its entire stack. Such data may include headers and payload data required to determine, for example, if a new connection is established, an existing connection is identified, a type of data being transmitted, or a combination thereof. Therefore, to this end, each sensor 140 is configured to process the complete stack of each wireless protocol supported by the sensor 140. Examples for such wireless protocols are mentioned above. In an embodiment, each sensor 140 can handle at least one type of wireless protocol.

In another embodiment, the sensor 140 can extract traffic parameters by querying the network elements 121. For example, the sensor 140 can query a wireless access point about new connections being established.

The data extracted by each sensor 140 is sent to the security system 150 for further analysis. In some embodiments, only data that can be utilized to detect vulnerabilities in networks is sent to the security system 150. For example, when the sensor 140 identifies a new wireless connection, data associated with the new wireless connection is sent to the security system 150.

In an embodiment, the sensor 140 is also configured to perform at least one mitigation action under the control of the security system 150. For example, the sensor 140 can terminate a wireless connection determined to be vulnerable or otherwise restricted by the organization. It should be noted that the control of the system 150 over a sensor 140 can be limited to configuring the sensor 140 with a policy to be executed. A sensor 140 can independently handle (e.g., intercept, process, mitigate, or a combination thereof) traffic based on the policy configured by the system 150. Such policies can be configured on-the-fly based on, for example, vulnerabilities detected by the system 150.

Each sensor 140 may be realized as a physical appliance, a virtual appliance (executed by a processing system), or a combination thereof. Examples for virtual appliance implementations include, but are not limited to, a virtual machine, a micro-service, a software agent, and the like.

Each sensor 140 is implemented in the wireless environment 100. As will be discussed below, there are 3 different types of a sensor 140. One type is a dedicated hardware device physically deployed in the wireless environment 100 (e.g., deployed in proximity to one or more of the components of the wireless environment 100). Another type of a sensor 140 is integrated in or operable in conjunction with a network element 121 for providing network services among the network infrastructure. Yet another type of sensor is a software agent installed on a wireless device 110. In some embodiments, the sensors 140 may include a combination of hardware sensors deployed in the wireless environment 100, network infrastructure sensors integrated in a network infrastructure, and agent sensors installed in the wireless devices 110. It should be noted that not all of the different types of sensors are necessarily deployed in the wireless device 110.

The security system 150 may be deployed in a datacenter, a cloud computing platform (e.g., a public cloud, a private cloud, or a hybrid cloud), on-premises of an organization, or in a combination thereof. The security system 150 may be also integrated or installed on a dedicated hardware device that may serve as a sensor 140. It should be further noted that, in some configurations, one or more sensors 140 can be embedded in the security system 150.

In an example deployment, the security system 150 is configured to interface with one or more external systems 160. Examples for such systems 160 may include, but are not limited to, an active directory of the organization utilized to retrieve user permissions, access control systems, SIEM systems utilized to report on detected vulnerabilities, or other devices that can feed the security system 150 with potential threats or known vulnerabilities.

The security system 150 is configured to detect if any of the wireless networks 120 are vulnerable based on data extracted by and received from the sensors 140, and hence any potential vulnerable networks including a group (i.e., two or more) of the wireless devices 110 or a single wireless device 110.

In an embodiment, the security system 150 is configured to determine potential cyber security vulnerabilities based on data received from the sensors 140. A potential vulnerability may occur and be detected when, for example, a wireless network 120 connects to the internal network 130, a wireless network 120 accesses a protected resource 131, a wireless device 110 connects to a vulnerable wireless network 120, sensitive data is sent to or from the wireless network 120, a new or unrecognized access point is deployed in a network infrastructure of the wireless environment 100, a combination thereof, and the like.

Alternatively or collectively, the security system 150 is configured to determine if the wireless network 120 bridges between the internal network 130 and a resource (not shown) external to the environment 100. For example, such an external resource may be a command-and-control server, a drop zone or end-point, and the like. In an embodiment, if it is determined that the wireless network 120 bridges between the internal network 130 and an external resource, the security system 150 may be configured to determine the wireless network 120 as vulnerable.

Alternatively or collectively, the security system 150 is configured to determine if the wireless network 120 is an unknown network or if any device 110 connected in the wireless network 120 performs malicious activity. Malicious activity may include, for example, trafficking sensitive information, any activity that matches a known attack pattern, abnormal activity, or a combination thereof. In an embodiment, if it is determined that the wireless network 120 is an unknown network or that the device 110 performs malicious activity, the security system 150 may determine the wireless network 120 as vulnerable. An unknown network is a network that is not part of the IT infrastructure of the organization.

In an embodiment, the security system 150 is configured to determine a risk factor for each wireless network 120 determined to be suspicious or vulnerable. The risk factor is based on, for example, the type of the detected vulnerability, the internal resources being accessed, the type of data being exploited, a device type, a connection type, any combination thereof, and so on.

In an embodiment, upon determining a potential cyber security vulnerability, the security system 150 is configured to perform or initiate a mitigation action. A mitigation action may include, but is not limited to, terminating any connection to the vulnerable wireless network 120, from the vulnerable wireless network 120, or both. For example, if a vulnerable wireless network 120 is a Wi-Fi network, a connection to an access point can be terminated.

In an embodiment, upon detection of a vulnerable wireless network 120, an alert is generated, displayed, or otherwise reported to a user of the security system 150. In some example embodiments, an event indicating detection of a vulnerable wireless network 120 is generated and sent to an external system (e.g., a SIEM system).

According to the disclosed embodiments, the security system 150 is configured to create a list of legitimate devices. A legitimate device is a wireless device 110 that is authorized to access the internal network 130 or any protected resource 131. The list of legitimate devices can be populated over time, for example, by monitoring which of the wireless devices 110 authenticate to a wireless connection of the internal network 130. For example, a smartphone connected to a Wi-Fi of the organization over a secured connection may be added to the list of legitimate devices. In another example, a list of legitimate devices can be retrieved from an external system (e.g., an active directory of the organization). It should be noted that any legitimate device may be a protected computing resource of the organization.

In an embodiment, any legitimate device added to the list is first checked to detect at least known or potential vulnerabilities. For example, a virus scan can be performed prior to adding a device to the list of legitimate devices. As yet another example, if a device is not installed with the recent security patch, such a device may not be included in the list. In another embodiment, an aging counter may be associated with each device added to the list of legitimate devices. The aging counter determines when the respective device should be removed out of the list.

The list of legitimate devices may be saved in a database (not shown) or in the system 150, where each wireless device in the list may be designated by, for example, its MAC address, type, vendor, wireless communications supported by devices, other identifiers, or a combination thereof.

The activity of each wireless device 110 in the legitimate list is monitored to at least determine if the wireless device 110 is connected to or forms a wireless network 120 (a network outside of the organization). A wireless network 120 can be formed through a connection to a different wireless device 110 that may be a legitimate or unknown device. An unknown device is a wireless device 110 that cannot be identified as a legitimate device.

Any connection established or acknowledged by a legitimate device is detected based on the data provided by the sensors 140. For example, such data provided by the sensors 140 (hereinafter "protocol-data") may include an indication of a new connection, a network (e.g., MAC) address of a source or destination device, and so on. Based on the network address, it is determined if the wireless connection is with a legitimate or with an unknown device.

Any wireless connection between or among at least two devices, where each of the at least two devices is a legitimate device, is considered as a safe connection and, thus, a wireless network 120 formed based on such a wireless connection is considered safe. As an example, illustrated in FIG. 2, a Bluetooth® connection is established between a smartphone 210 and a laptop 220, where each of the smartphone 210 and the laptop 220 is a legitimate device (e.g., of an employee of the organization). The Bluetooth® network 201 established between the devices 210 and 220 is considered safe. If should be noted that the devices 210 and 220 may be authenticated over a first type of wireless protocol (e.g., IEEE 802.11n) and determined safe when connected using a second type of wireless protocol (e.g., Bluetooth).

Any wireless connection between or among a legitimate device and at least one unknown device is considered as a suspicious connection and, thus, a wireless network formed based on such connected wireless connection is considered suspicious. As an example, illustrated in FIG. 2, a Bluetooth® connection is established between a laptop 220 and a smart-watch (a wearable wireless device) 230. The laptop 220 is a legitimate device, but the smart-watch 230 is an unknown device. The Bluetooth® network 202 established between the devices 220 and 230 is considered suspicious.

Figure 2:
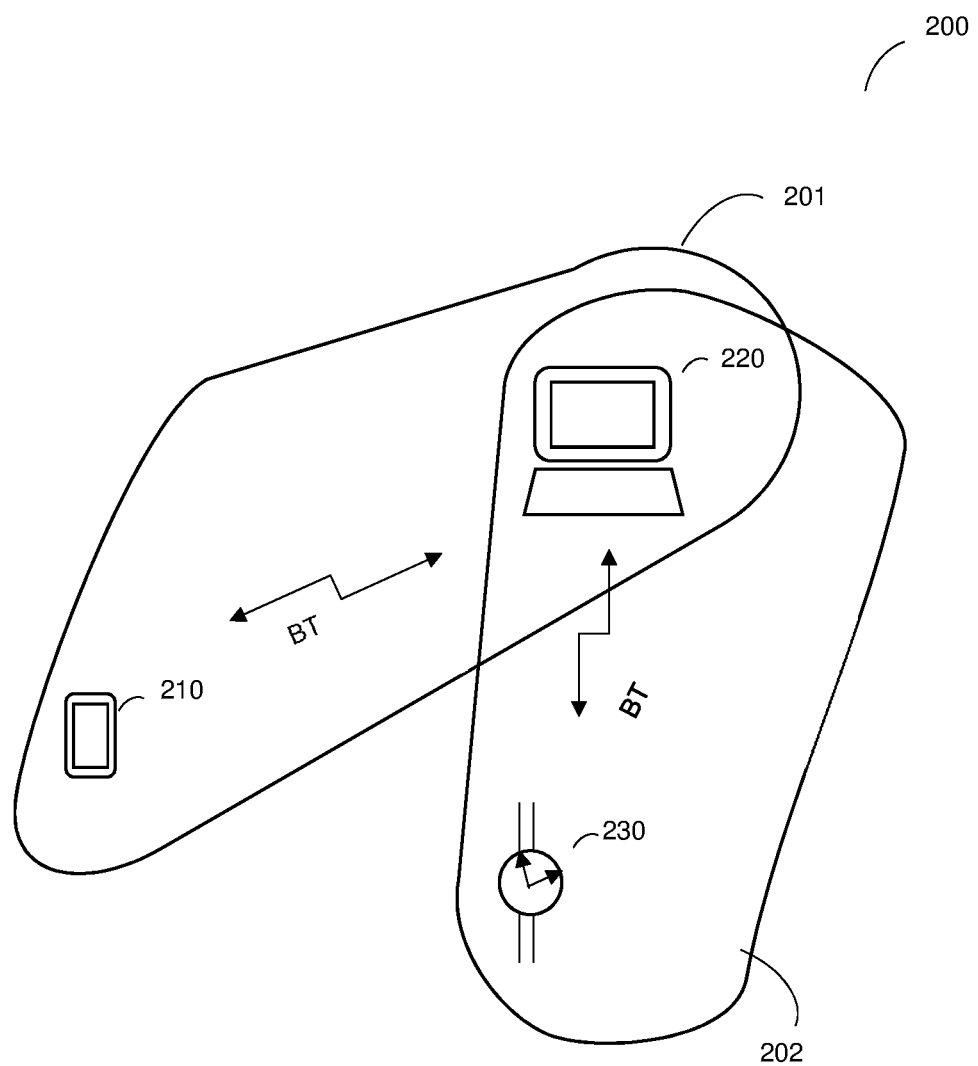
FIG. 2 demonstrates the connectivity of safe and vulnerable networks.

As can be seen in FIG. 2, a single legitimate device 220 can be part of a safe wireless network 201 and part of a suspicious (or vulnerable) wireless network 202 at the same time. Thus, any connection to or from a legitimate device should be examined to provide a comprehensive security solution.

In another embodiment, one or more investigation actions can be initiated to determine if any identified "suspicious" wireless network is a vulnerable network. In an embodiment, a risk score is determined based on the connection type, transmitted data, usage patterns, a fingerprint of an unknown device, or any combination thereof, based on one or more investigation actions. In a further embodiment, if the risk score is, for example, above a predefined threshold, a suspicious wireless network is determined as a vulnerable network. In another embodiment, any suspicious wireless network may be considered as a vulnerable network.

An investigation action may include, but is not limited to, classifying the data transmitted between the legitimate device and the unknown device (and, particularly, data sourced at the legitimate device). The classification is performed to determine if at least sensitive information is transmitted to the unknown device. To this end, any payload data in the protocol-data is gathered and classified using a data loss prevention (DLP) service. Such a DLP service can be integrated in the security system 150 or one of the external system 160. Typically, a DLP service is designed to detect certain data patterns indicative of the type of data.

If the transmission of sensitive information is detected over the wireless network (e.g., the network 202, FIG. 2), the risk factor of the connection between the legitimate device and the unknown device is set, for example, to a high value (e.g., a value above a predetermined threshold). Sensitive information may include any type of information that is predefined as valuable or confidential for the organization.

Another investigation action includes analyzing a usage pattern of the suspicious wireless network, and particularly the usage pattern over the connection between the legitimate device and the unknown device. The usage pattern may include time periods that the connection is active, amounts of data being transmitted at different time intervals, a number of active devices in the network, and so on. An anomaly is determined based on the usage patterns. The anomaly may be determined further based on baselines for the usage patterns. A baseline for a usage pattern can be derived, for example, based on the type of devices connected in the wireless network, the type of the wireless network, usage patterns of similar networks determined to be safe, and so on. For example, a usage pattern of the wireless network 201 can serve as a baseline for the wireless network 202.

The following are some examples for detecting anomalies based on the usage patterns. The examples will be discussed with reference to the suspicious wireless network 202 shown in FIG. 2. An instance in which the smart-watch 230 remains connected to the laptop 220, thereby maintaining an active connection when the office is closed (e.g., at night time), would be considered as an anomaly. This is due to the fact that a user of the smart-watch 230 is not present at the office at that time. That is, the wireless network 202 is active when it should not be active.

As another example, if the volume of traffic typically transmitted by the smart-watch 230 is low (e.g., 100 KB) at a particular time interval. When it is detected that the smart-watch 230 transmits a high volume of data (e.g., 1 GB), such a transmission would be considered as an anomaly.

When a usage pattern type of anomaly is detected over a wireless network (e.g., the wireless network 202, FIG. 2), the risk factor of the connection between the legitimate device and the unknown device is set, for example, to a high value.

Another investigation action includes analyzing a fingerprint of each unknown device in the suspicious wireless network. In an embodiment, the fingerprint may include the device's type, the OS version or version of other software installed therein, an indication of whether the unknown device is discoverable or connectable to other wireless devices, a number of active wireless connections, and so on. The fingerprint can designate if the wireless device is connected to a network that was not identified. For example, a connection of an unknown device to an internal network through a wired connection may increase the risk of the device.

As an example, if the smart-watch 230 is installed with an OS version known to be vulnerable, the smart-watch 230 is determined as a risky device and the risk factor will be set accordingly. As yet another example, if the smart-watch 230 acknowledges any connection request or ping, the smart-watch 230 is determined as a risky device and the risk factor will be set accordingly.

It should be noted that examples provided below are not limited to the wireless networks and wireless devices demonstrated in FIG. 2. The investigation actions discussed herein can be applied on any type of wireless network and wireless devices.

Returning to FIG. 1, the risk factor determined by any investigation action may be a numerical number (e.g., a number ranging from 0 to 10, where 10 is the highest risk), a deterministic value (e.g., low, medium, high), and the like.

The risk score determined for a suspicious wireless network 120 may be a function of the various risk factors. Such a function can be an average, a weighted average, and the like. As noted above, when the risk score is over a predefined threshold, a suspicious wireless network 120 is determined as a vulnerable network. In some embodiments, a decision to perform a mitigation action is based on the determined risk score.

It should be appreciated that the embodiments disclosed herein are not limited to the specific architecture illustrated in FIG. 1 and other architectures may be used without departing from the scope of the disclosed embodiments. Specifically, in an embodiment, there may be a plurality of security systems 150 operating as described hereinabove and configured to either have one as a standby, to share loads between them, or to split the functions between them. Furthermore, in a typical wireless environment 100 or a typical deployment, there will be a plurality of internal networks 130 which can co-exist, i.e., a single network 130 is shown FIG. 1 merely for purposes of simplicity of the discussion. As noted above, an internal network 130 of an organization includes protected resources 131. The plurality of internal networks 130 may be within the control of the same or a different organization.

Figure 3:
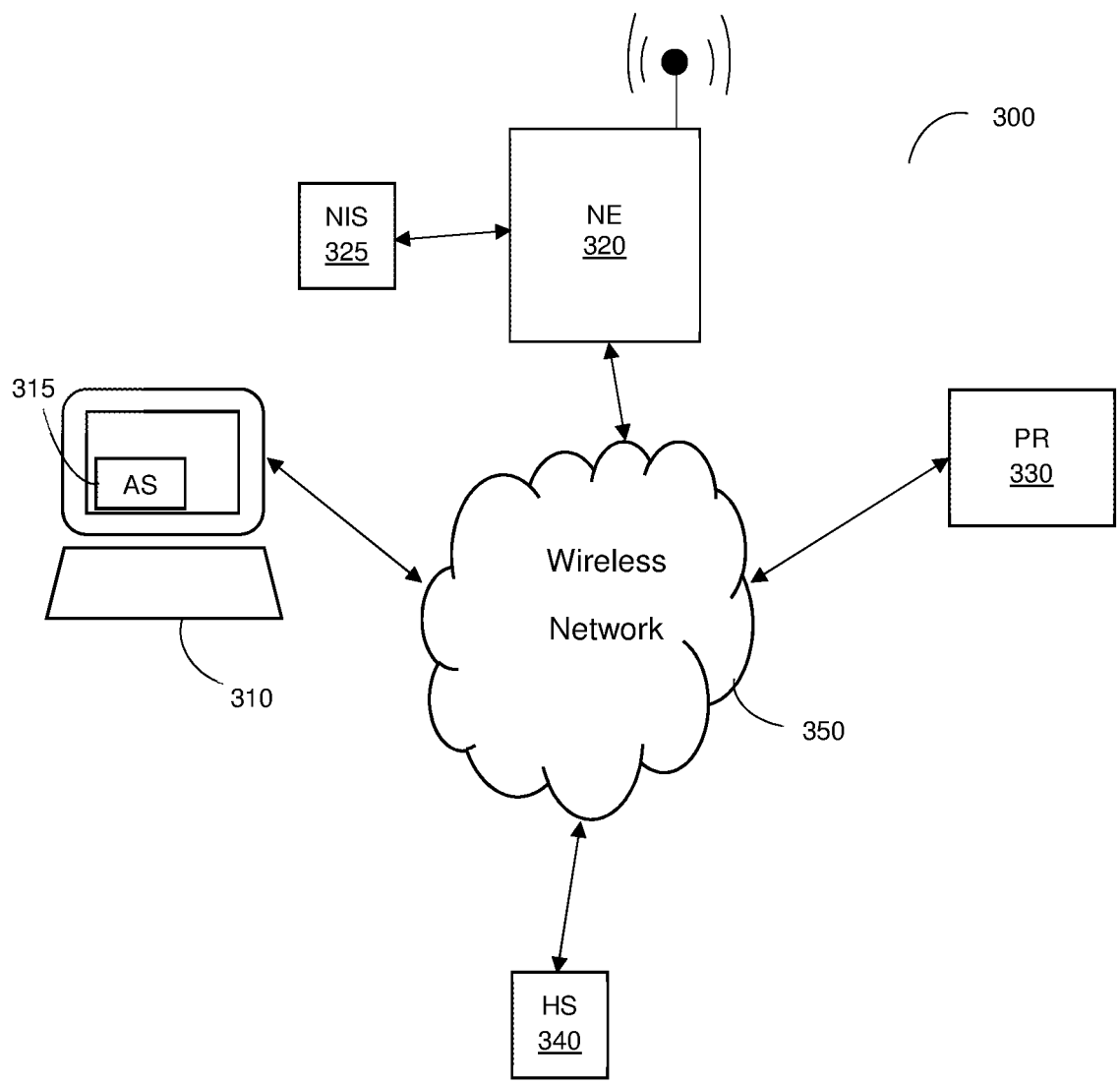
FIG. 3 is an example network diagram utilized to describe determination of network vulnerabilities according to various disclosed embodiments.

FIG. 3 shows an example network diagram 300 utilized to describe utilization of sensors to detect potential network vulnerabilities according to various disclosed embodiments. The example network diagram 300 includes a wireless device 310, a network element (NE) 320, a protected resource (PR) 330, and a hardware sensor communicatively connected via a wireless network 350. The protected resource 330 may be, but is not limited to, a server, a computer, a database, a service, an application, data, and the like.

The wireless network 350 may include any network allowing for communicating via wireless protocols such as, but not limited to, but not limited to, Wi-Fi, nRF, cellular communication protocols (e.g., LTE, 2G, 3G, 4G, etc.), Bluetooth®, Wi-Gi, Zigbee, Z-Wave, 5 BLE, EnOcean, DECT, and the like. The wireless network 350 may be an individual network, or may include a plurality of networks allowing for communications between and among the wireless device 310, the network element 320, the protected resource 330, and the hardware sensor 340.

The wireless device 310 may be, but is not limited to, a laptop, a PC, a smartphone, an Internet of Things (IoT) device, a wearable device, a peripheral device (e.g., a printer, a mouse, a keyboard, a speaker, etc.), an appliance, a remote controller, a wireless router (access point), or any electrical or electronic device that can communicate over a wireless network.

The wireless device 310 may have installed thereon an agent operable as a wireless sensor (AS) 315 (hereinafter an "agent sensor"). In an embodiment, the agent sensor 315 may be configured to collect data related to the wireless device 310 such as, but not limited to, device configuration (e.g., software updates, antivirus programs installed thereon, etc.), network connection information of network connections to be established with the wireless device 310, traffic to or from the wireless device 310, and the like. In a further embodiment, the agent sensor 315 may be configured to determine, based on the collected wireless device data, whether there is a potential network vulnerability. In yet a further embodiment, the agent sensor 315 may be further configured to perform mitigation actions such as, but not limited to, blocking the wireless device 310 from connecting to a network, initiating a secured communication protocol for transmitting information to and from the wireless device 310, reconfigure the wireless device 310, and the like.

The agent sensor 315 can be implemented as a software application installed on the wireless device 315, a plug-in, an add-on, operating system (OS) services, and the like. It should be noted that software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by a processing circuitry, cause the processing circuitry to perform the various functions described herein.

The network element 320 is a component of a network infrastructure allowing for communications among components of the network diagram 300. The network element 320 may be, but is not limited to, an access point (e.g., a Wi-Fi access point), a network access controller, a router, a firewall, an intrusion detection and prevention system, and the like. The access point may be communicatively connected to or integrated in a router (not shown).

According to an embodiment, a network infrastructure sensor (NIS) 325 is integrated in the network element 320. For example, in such an embodiment, the network infrastructure sensor 325 may be firmware installed on the network element 320. In another embodiment, the network infrastructure sensor 325 is an external appliance that operates in conjunction with the network element 320. For example, the connection may be performed through a simple network management protocol (SNMP), an application program interface (API), and the like.

In an embodiment, the network infrastructure sensor 325 may be configured to collect data related to the network element 320 such as, but not limited to, lists of clients connected to the network 350, traffic to or from the network element 320, results of analysis of traffic to or from the network element 320, and the like.

In a further embodiment, the network infrastructure sensor 325 may be configured to determine, based on the collected wireless device data, whether there is a potential network vulnerability. In yet a further embodiment, the network infrastructure sensor 325 may be further configured to perform mitigation actions such as, but not limited to, blocking the wireless device 310 from communicating with the network element 320, initiating a secured communication protocol for transmitting information to and from the network element 320, and the like.

In an embodiment, the network infrastructure sensor 325 may be configured to change the functionality and/or operation mode of a network element 320 the sensor communicates with. For example, the sensor 325 may configured to the network element 325 to operate a tap or a monitor device. The configuration is performed through an SNMP command or an API. In a preferred embodiment, the configuration is performed through user interface (UI) automation, where commands are sent over a secure shell (SSH).

Figure 4:
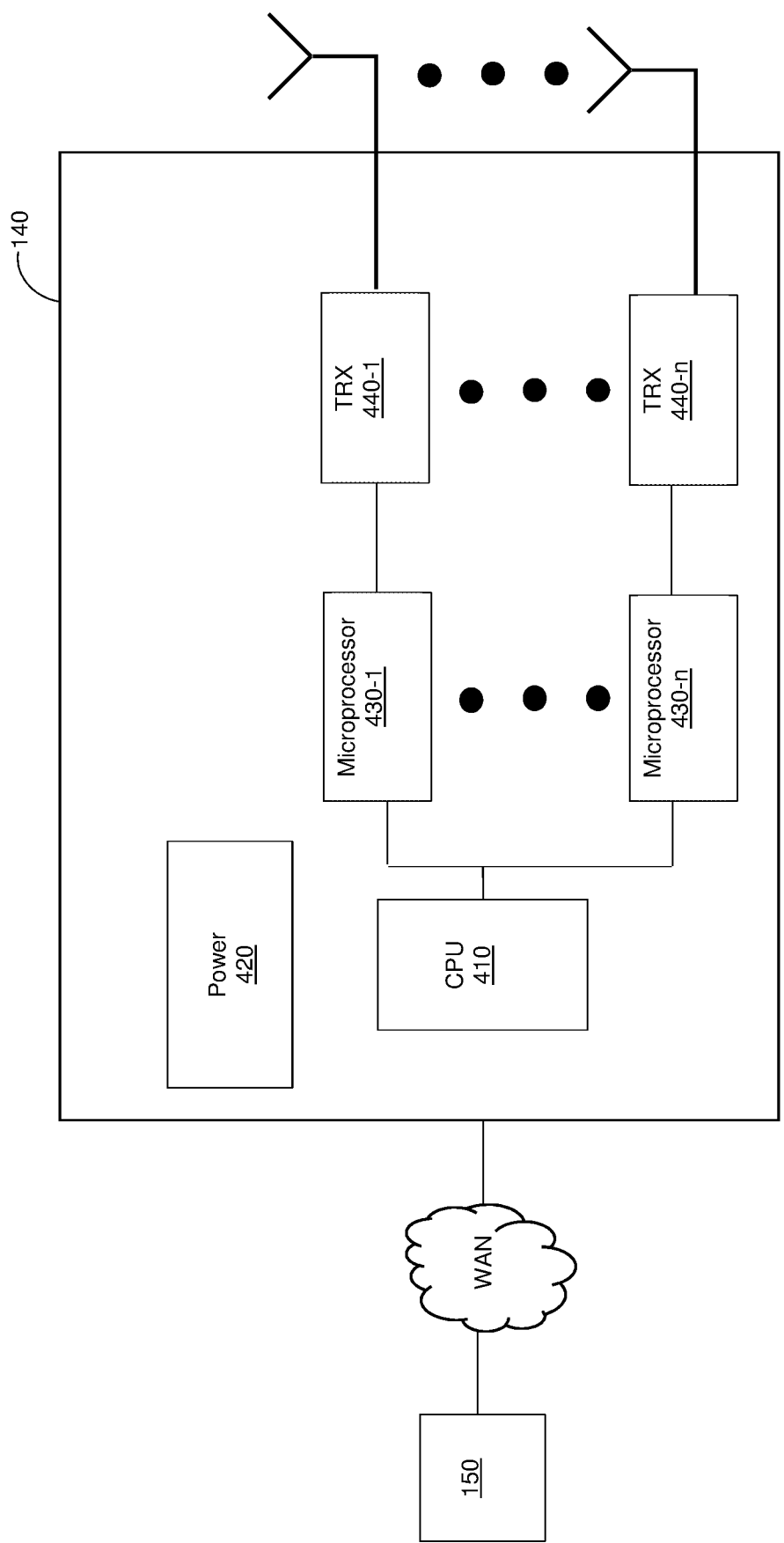
FIG. 4 is a schematic diagram of a hardware sensor according to an embodiment.

In an embodiment, the hardware sensor 340 is deployed so as to capture traffic among the wireless device 310, the access point 320, and the protected resource 330. The hardware sensor 340 may include, but is not limited to, one or more antennas, one or more modulators, and other components (not shown) for capturing traffic and, in particular, traffic transmitted via different communication protocols (e.g., Wi-Fi, Bluetooth, Zigbee, Z-Wave, etc.). An example block diagram of a hardware sensor 140 is shown in FIG. 4.

The following are various examples utilized to describe using the agent sensor 315, the network infrastructure sensor 325, the hardware sensor 340, or a combination thereof (hereinafter referred to collectively as the network sensors, merely for simplicity purposes), for determining potential network vulnerabilities.

As a first example, the network sensors may be utilized to collect data related to the wireless network 350 or to connections (either direct or indirect) between the wireless network 350 and external resources (e.g., other networks, devices, etc.). In this example, the network sensors may be further utilized to identify potential vulnerabilities in the network 350 or due to connections between the network 350 and the external resources. Such potential vulnerabilities may include, but are not limited to, communications with networks that are unknown or associated with malicious activity, bridges between the network 350 and an external resource, the access point 320 being unapproved, the wireless device 310 being misconfigured so as to permit bridging (e.g., if the wireless device 310 is configured to remember network names of previously connected networks and to subsequently attempt connections with the previously connected networks), and sensitive data passing through the network 350.

In this first example, the network sensors are configured to collect at least traffic data related to the network 350. The traffic data may include, but is not limited to, metadata indicating connections, amounts of traffic, classifications of traffic as either sensitive or not sensitive, network boundaries, combinations thereof, and the like. The agent sensor 315 may further be configured to collect data identifying networks that the wireless device 310 is connected to. The network infrastructure sensor 325 may further collect data such as, but not limited to, lists of clients connected to the network element 320, identifications of rogue access points by the network element 320, interference data indicating protocols and devices using such protocols, and the like.

As a second example, the network sensors may be utilized to collect data related to the wireless device 310, and to identify the wireless device 310, to identify other wireless devices (not shown) that can communicate with the wireless device 310, to analyze risks of vulnerabilities due to connection of the wireless device 310 to the network 350), or a combination thereof. Identification of certain devices may be utilized to, e.g., block access of known problematic devices. As non-limiting examples, such problematic devices may include malicious devices such as a wireless pineapple used for network penetration, unintentionally unsecured devices such as the Amazon Echo® (which automatically records and uploads audio), and the like.

In this second example, the various sensors may be configured to collect data including MAC addresses of the wireless device 310, of other devices in communication with the wireless device 310, or both. The agent sensor 315 may be further configured to probe other wireless devices communicatively connected with the wireless device 310. The network infrastructure sensor 325, the hardware sensor 340, or both, may further be configured to probe the wireless device 310.

The probe may include, but is not limited to, Simple Service Discovery Protocol (SSDP) scans, multicast Domain Name System (mDNS) scans, scanning at least one port of the network element 320, extracting data related to the wireless device 310 from a service utilized by the wireless device 310 (e.g., a Universal Plug and Play service utilized by the wireless device 310 to discover other proximate devices), and the like. The hardware sensor 340 may also be configured to interrogate the wireless device 310 to obtain data such as, but not limited to, device profile, capabilities, device name, and the like. The hardware sensor 340 may additionally be configured to imitate a vulnerable client and to check if the wireless device 310 attempts to attack the imitation vulnerable client.

It should be emphasized that in a wireless environment including a plurality of sensors 140 of different types, a single wireless device 110 can be probed and interrogated differently by different sensors. That is, each sensor performs such actions based on its capabilities. For example, a smartphone device in the network can be probed over Bluetooth from a hardware-type sensor and over SSDP from a network-type sensor at the same time.

As a third example, the network sensors may be utilized to collect data related to traffic through the wireless network 350, and to identify sensitive data flows through the network 350. In this third example, the network sensors may be configured to intercept and analyze traffic sent via the network 350, and may be further configured to decrypt data (e.g., payload data) among the sent traffic. The network infrastructure sensor 325 may be configured to monitor and analyze traffic to be sent via the network 350.

As a fourth example, the network sensors may be utilized to determine security of the network element 320 deployed in the network 350. In some implementations, the network sensors may be configured to determine whether the network element 320 is an access point and, if so, whether the access point network element 320 is a managed or unmanaged access point (i.e., where an unmanaged access point may be a rogue access point). To this end, the agent sensor 315, the hardware sensor 340, or both, may be configured to determine whether the network element 320 allows unencrypted connections, when the network element 320 is an unmanaged access point that does not meet one or more normal access point rules (e.g., if the network element 320 is a home router with a different SSID and password but serving a corporate network). The network infrastructure sensor 325 may be configured to collect data related to other network elements (not shown) deployed in the network 350, and to further identify configuration differences between the network element 320 and the other network elements, check security of each configuration of the other network elements, monitor additions and removals of access points, identify rogue access points, identify unmanaged access points, combinations thereof, and the like. The agent sensor 315 may be further configured to check the integrity of the network 350 when the wireless device 310 is connected to the network 350 (e.g., by identifying DNS misconfigurations).

As a fifth example, the network sensors may be utilized to determine a physical location of the wireless device 310. To this end, the hardware sensor 340 may be configured to identify devices within range of the sensor 340, and to determine a physical location of the wireless device 310 as the physical location of the sensor 340 when the wireless device 310 is within range of the sensor 340. The hardware sensor 340, the network infrastructure sensor 325, or both, may also be configured to collect data including the RSSI of every packet sent by the wireless device 310, thereby allowing for estimation of the distance between the sensor 340 and the wireless device 310. A plurality of network infrastructure sensors 325 may also be configured to triangulate the position of the wireless device 310. The agent sensor 315 may be configured to query a global positioning system (GPS) of the wireless device 310, to identify Wi-Fi beacons in proximity to the wireless device 310, to use IP geolocation on an external IP address of the wireless device 310 connected to a Wi-Fi network, a combination thereof, and the like.

It should be understood that the above-noted examples illustrate various implementations of the network sensors described herein, and that the example implementations do not limit the disclosed embodiments. In particular, various of the example implementations may be combined without departing from the scope of the disclosure. For example, determination of the physical location of the wireless device 310 may be utilized in combination with identifying the wireless device 310 (i.e., the determined location may be utilized to identify the wireless device 310).

In various embodiments, the network sensors may be configured to perform mitigation actions in response to events triggered based on data collected by the network sensors. Such mitigation actions may include, but are not limited to, disconnecting active connections, blocking a device, and containing a device outside of the network 350. The mitigation actions may be performed in real-time, near real-time, or at a scheduled time. For example, a software update can be triggered upon detection of a vulnerability while a remedy action (software update) will be scheduled for after working hours. Other mitigation actions may include, configuring a sensor 340 to terminate connections within range, forcing the wireless device 310 to forget a network password of the network 350 (thereby requiring a user of the wireless device 310 to manually re-connect), establishing a containment network and force the wireless device 310 to connect to the established containment network, causing traffic to be transmitted through a secure connection, combinations thereof, and the like. In an embodiment, different sensor-types can perform different mitigation actions.

In various other embodiments, the network sensors may be utilized to provide vulnerability scans on-demand. In particular, the network sensors may be configured to probe the wireless device 310 for vulnerabilities. To this end, the hardware sensor 340 may be configured to perform a low-level scan such as by testing if probe requests are sent by the wireless device 310 to other networks (not shown), to perform a high-level scan such as by forcing the wireless device 310 to connect to a containment network and communicating directly with the wireless device 310 (thereby allowing for vulnerability testing), or both, The network infrastructure sensor 325 may be configured to passively perform low-level and high-level scans based on monitored traffic, or to actively perform low-level scans of the wireless device 310. The agent sensor 315 may be configured to scan either the wireless device 310, or to initiate a connection to a remote wireless device (not shown) connected to the network 350 and to perform a scan of the device remotely.

It should be understood that the embodiments described herein are not limited to the specific architecture illustrated in FIG. 3, and that other network infrastructures may be equally used without departing from the scope of the disclosed embodiments.

It should be further noted that the example network diagram 300 shown in FIG. 3 is described with respect to a agent sensor 315, a network infrastructure sensor 325, and a hardware sensor 340, merely for simplicity purposes and without limitation on the disclosed embodiments. More or fewer of each sensor may be equally utilized without departing from the scope of the disclosure such that the sensors implemented in the network diagram 300 may include at least one of agent sensors, network infrastructure sensors, or hardware sensors. As non-limiting examples, an agent sensor may be installed on each of a plurality of wireless devices configured to access the network, a network infrastructure sensor may be implemented in each of a plurality of access points deployed to facilitate network access to the protected resource 330, a plurality of hardware sensors may be deployed in different physical or network locations with respect to the network diagram 300. Further, types of sensors such as the agent sensors, the network infrastructure sensors, the hardware sensors, or two of the aforementioned types of sensors, may not be utilized. As non-limiting examples, the network infrastructure sensor 325 and one or more hardware sensors 340 may be utilized without the agent sensor 315, only the network infrastructure sensor 325 may be utilized without the agent sensor 315 or the hardware sensor 340, and the like.

FIG. 4 is an example schematic diagram 400 of a hardware sensor 140 according to an embodiment. The hardware sensor 140 includes a central processing unit (CPU), a power source 420, a plurality of microprocessors 430-1 through 430-*n* (hereinafter referred to individually as a microprocessor 430 and collectively as microprocessors 430, merely for simplicity purposes), and a plurality of transceivers (TRX) 440-1 through 440-*n* (hereinafter referred to individually as a transceiver 440 and collectively as transceivers 440, merely for simplicity purposes). It should be noted that *n* is an integer greater than or equal to 1, and that a plurality of microcontrollers 430 and a plurality of transceivers 440 are shown in FIG. 4 merely for simplicity purposes.

In the example schematic diagram 400, the hardware sensor 140 is communicatively connected to a first network to communicate with the security system 150 and a second network which is communicatively connected to a wireless device. The first network may be a wired or wireless network. The second network is a wireless network. Each microprocessor 430 is configured to process signals according to a wireless protocol respective of the transceiver 440 it operates. For example, a microprocessor 430-1 processes BTE signals, while the microprocessor 430-2 processes ZigBee signals.

The central processing unit 410 may be configured to determine whether potential vulnerabilities exist by analyzing at least a portion of the collected data, and may be further configured to mitigate such determined potential vulnerabilities, as described further herein.

Figure 5:
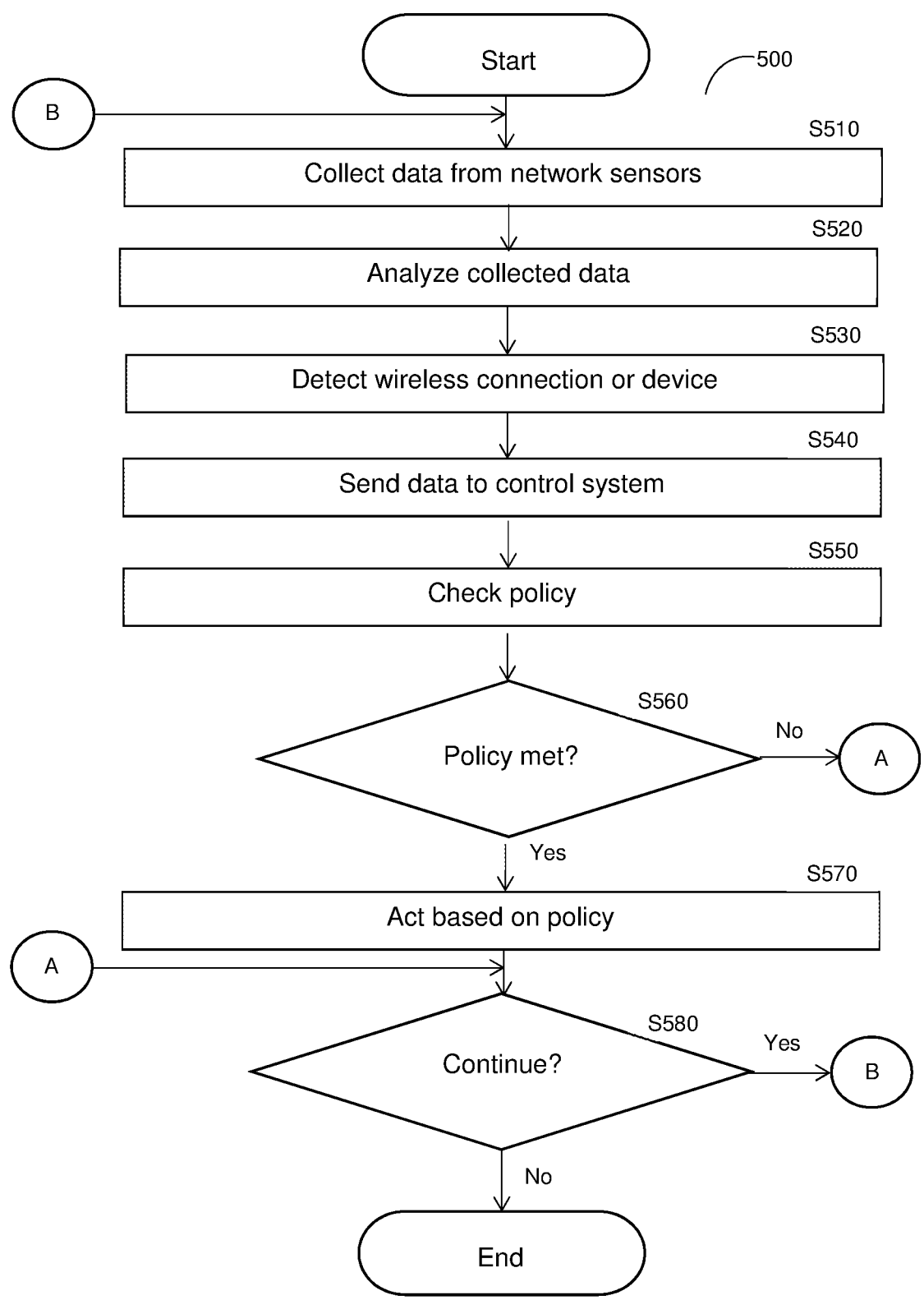
FIG. 5 is a flowchart illustrating a method for detecting and mitigating potential network vulnerabilities according to an embodiment.

FIG. 5 is an example flowchart 500 illustrating a method for detection and mitigation of potential vulnerabilities in a wireless environment using network sensors according to an embodiment. In an embodiment, the method may be performed using at least one sensor deployed in the wireless environment. The sensor may be a hardware sensor (e.g., sensor 340), an agent sensor (e.g., the agent sensor 315) installed on at least one user device accessing the network, or at least one network infrastructure sensor (e.g., the network infrastructure sensor 325). It should be noted that multiple sensors of different types can be utilized to detect the vulnerabilities. In such a deployment, the sensors can work independently or collectively.

At S510, data is collected from each of the network sensors. The collected data may include, but is not limited to, traffic data (e.g., metadata indicating connections, amounts of traffic, sensitivity classifications, network boundaries, etc.), data related to wireless devices, data related to network elements, and the like.

Further, agent sensors among the network sensors may be configured to collect data indicating, for example but not limited to, identifiers of networks a wireless device is connected to, results of probes of other wireless devices in communication with a wireless device, whether network elements communicatively connected to a wireless device allow unencrypted connections, results of queries to GPS of a wireless device, identifications of Wi-Fi beacons in proximity to a wireless device, results of IP geolocation on an external address of a wireless device, the integrity of a network connected to a wireless device, a combinations thereof, and the like.

Additionally, hardware sensors among the network sensors may be configured to collect data indicating, for example but not limited to, results of probes (e.g., SSDP scans, mDNS scans, port scans, extractions of data, etc.) of devices (wireless and non-wireless), device interrogation data (e.g., device profile, capabilities, device name, etc.), detections of attacks directed to the hardware sensor imitating a vulnerable client, whether a network element allows unencrypted connections, RSSIs of packets sent by a wireless device, combinations thereof, and the like.

Moreover, network infrastructure sensors among the network sensors may be configured to collect data indicating, for example but not limited to, lists of clients connected to a network element, identifications of rogue access points by a network element, interference data, results of probes of wireless devices (e.g., SSDP scans, mDNS scans, port scans, extractions of data, etc.), traffic sent to or from a network element, data related to other network elements deployed in the same network as a network element, configuration differences among network elements, identifications of rogue access points, identifications of unmanaged access points, triangulated positions of wireless devices detected using a plurality of network infrastructure sensors, combinations thereof, and the like.

At S520, the collected data is analyzed. The analysis may include extracting data utilized for detecting potential network vulnerabilities.

At S530, based on the analysis, at least one suspicious wireless entity is detected. The at least one wireless entity may include at least one wireless connection, at least one wireless device, at least one wireless network, or a combination thereof. Detecting the at least one wireless entity may include, but is not limited to, identifying a new connection, determining a network address of a source or destination device, identifying a newly connected network or device, probing wireless devices connected to within the wireless environment, combinations thereof, and the like.

At S540, data indicating the detected at least one wireless entity may be sent to, e.g., a control system (for example, the security system 150, FIG. 1). The control system may be configured to monitor detected connections and devices, to mitigate potential vulnerabilities, or both.

At optional S550, a security policy is checked with respect to the detected at least one wireless entity. The policy may be dynamically configured based on detected connections and devices, and may be utilized to determine whether a potential network vulnerability exists.

At optional S560, it is checked if each detected wireless entity meets the security policy (i.e., if a potential network vulnerability exists) and, if so, execution continues with S570; otherwise, execution continues with S580.

At optional S570, when it is determined that the security policy has been met, at least one action may be performed. The at least one action may include, but is not limited to, one or more mitigation actions (e.g., reconfiguring network elements or wireless devices, blocking traffic, etc.), performing further probing (e.g., by obtaining additional particular information from the network sensors), combinations thereof, and the like.

It should be noted that, in an embodiment, steps S550 through S580 may be performed by a control system configured to monitor traffic and cause enforcement of security policies for wireless environments. To this end, the method may further include receiving instructions from the control system and enforcing a security policy based on the received instructions.

At S580, it is checked if execution should continue and, if so, execution continues with S510; otherwise, execution terminates. In an embodiment, new data collected from network sensors may be iteratively or continuously analyzed to detected wireless connections and devices, thereby allowing for constant monitoring of the network to detect potential vulnerabilities.

It should be noted that various embodiments described herein are discussed with respect to hardware sensors, network infrastructure sensors, and agent sensors, merely for simplicity purposes and without limitation on the disclosed embodiments. Other sensors configured at least to collect data from external sources within or connected to a network may be equally utilized as described herein without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting potential vulnerabilities in a wireless environment, comprising:
    collecting, by an out-of-band network sensor that can process a complete protocol stack for each respective one of a plurality of communication protocols deployed in the wireless environment, at least wireless traffic data, wherein the wireless traffic data employs at least two of the plurality of communication protocols;
    analyzing the collected wireless traffic data to detect at least activity of a wireless entity in the wireless environment, wherein the wireless entity is adapted to employ at least two of the plurality of communication protocols and wherein the wireless entity is a network element deployed in the wireless environment;
    enforcing a configured security policy on the wireless entity;
    collecting, by the network sensor, data related to the network element;
    determining, based at least on the collected network element data, whether the network element is an unmanaged element; and
    configuring the network element based on the results of the determination and the security policy.

2. The method of claim 1, wherein the network sensor is a hardware sensor deployed in the wireless environment, wherein the hardware sensor includes at least one microprocessor and at least two transceivers, wherein each microprocessor is configured to process signals according to a wireless protocol for a respective transceiver of the at least two transceivers.

3. The method of claim 1, wherein the network sensor is an agent sensor installed on a wireless device operable in the wireless environment, further comprising:
    collecting, by the agent sensor, data related to the at least wireless device; and
    executing the security policy based in part on the collected wireless device data.

4. The method of claim 1, wherein the network sensor is a network infrastructure sensor connected to a network element deployed in the wireless environment, further comprising:
    collecting, by the network infrastructure sensor, data related to the network element; and
    executing the security policy based in part on the collected network element data.

5. The method of claim 1, further comprising:
    probing, by the network sensor, a wireless device in the wireless environment;
    identifying, based at least on the probing, the wireless device; and
    enforcing of the security policy on the identified wireless device.

6. The method of claim 1, further comprising:
    identifying, based on the collected wireless traffic data, sensitive data being transmitted in the wireless environment; and
    handling the identification of the transmitted sensitive data based on the security policy.

7. The method of claim 1, wherein enforcing the security policy includes performing, by the network sensor, at least one of: disconnecting an active connection in real-time, blocking a device from connecting to a network of the wireless environment, generating an alert, modifying configuration of a device, and containing a device outside of a network of the wireless environment.

8. The method of claim 1, wherein the wireless environment further includes a wireless device, further comprising:
    collecting data related to the wireless device;
    determining, based on the collected wireless device data, a geographical location of the wireless device; and
    handling the determined geographical location based on the security policy.

9. The method of claim 1, further comprising:
    checking if the wireless entity meets the security policy based on the collected at least wireless traffic data, wherein the security policy is enforced when the wireless entity meets the security policy, wherein enforcing the security policy includes at least one of: performing at least one mitigation action, logging a detected incident, and initiating a probe of the wireless entity.

10. A non-transitory computer readable medium having stored thereon instructions for causing a processing circuitry to execute the method of claim 1.

11. A network sensor, comprising:
    a processing circuitry; and
    a memory, the memory containing instructions that, when executed by the processing circuitry, configure the network sensor to:
    collect at least wireless traffic data in a wireless environment;
    analyze the collected wireless traffic data to detect at least activity initiated by a wireless entity in the wireless environment, wherein the wireless entity is a network element deployed in the wireless environment;
    enforce a configured security policy on the detected wireless entity, wherein the security policy is stored in the memory;
    collect data related to the network element;
    determine, based at least on the collected network element data, whether the network element is an unmanaged element; and
    configure the network element based on the results of the determination and the security policy;
    wherein the network sensor is an out-of-band network sensor that can process the complete protocol stack for each respective one of a plurality of communication protocols deployed in the wireless environment, wherein the wireless traffic data employs at least two of the plurality of communication protocols, and wherein the wireless entity is adapted to employ at least two of the plurality of communication protocols.

12. The network sensor of claim 11, wherein the network sensor is a hardware sensor deployed in the wireless environment, further comprising:
    at least one microprocessor; and
    at least two transceivers, wherein each microprocessor is configured to process signals according to a wireless protocol for a respective transceiver of the at least two transceivers.

13. The network sensor of claim 11, wherein the network sensor is an agent sensor installed on a wireless device operable in the wireless environment, wherein the network sensor is further configured to:
  collect data related to the wireless device; and
  execute the security policy based in part on the collected wireless device data.

14. The network sensor of claim 11, wherein the network sensor is a network infrastructure sensor connected to the network element deployed in the wireless environment, wherein the network sensor is further configured to:
  collect data related to the network element; and
  execute the security policy based in part on the collected network element data.

15. The network sensor of claim 11, wherein the network sensor is further configured to:
  probe a wireless device in the wireless environment; and
  identify, based at least on the probing, the wireless device; and
  enforce the security policy on the identified wireless device.

16. The network sensor of claim 11, wherein the network sensor is further configured to:
  identify, based on the collected wireless traffic data, sensitive data being tunneled in the wireless environment; and
  handle the identification of the transmitted sensitive data based on the security policy.

17. The network sensor of claim 11, wherein the network sensor is further configured to perform at least one of: disconnect an active connection in real-time, block a device from connecting to a network of the wireless environment, generate an alert, modify configuration of a device, and contain a device outside of a network of the wireless environment.

18. The network sensor of claim 11, wherein the wireless environment further includes a wireless device, wherein the network sensor is further configured to:
  collect data related to the wireless device;
  determine, based on the collected wireless device data, a geographical location of the wireless device; and
  handle the determined geographical location based on the security policy.

19. The network sensor of claim 11, wherein the network sensor is further configured to:
  check if the wireless entity meets the security policy based on the collected at least wireless traffic data, wherein the security policy is enforced when the wireless entity meets the security policy, wherein the network sensor is further configured to perform at least one of: performing at least one mitigation action, logging a detected incident, and initiating a probe of the wireless entity.

* * * * *